United States Patent [19]

Stein

[11] 4,082,296
[45] Apr. 4, 1978

[54] SEAL FOR SEALING BETWEEN A ROTATING MEMBER AND A HOUSING

[76] Inventor: Philip C. Stein, Stein Seal Company 20th St. & Indiana Ave., Philadelphia, Pa. 19132

[21] Appl. No.: 690,069

[22] Filed: May 26, 1976

[51] Int. Cl.² .............................................. F16J 15/16
[52] U.S. Cl. ..................................... 277/3; 277/96.1; 277/133
[58] Field of Search .................. 277/148, 151, 72, 75, 277/27, 3, 96, 96.1, 133, 134

[56] References Cited

U.S. PATENT DOCUMENTS

| 2,402,033 | 6/1946 | Flinn | 277/96.1 |
| 2,835,514 | 5/1958 | McGahan | 277/3 |
| 3,176,910 | 4/1965 | Bentele | 418/142 |
| 3,606,349 | 9/1971 | Petrie et al. | 277/27 |
| 3,743,303 | 7/1973 | Pope | 277/27 |
| 3,888,495 | 6/1975 | Mayer | 277/3 |

Primary Examiner—Robert I. Smith
Attorney, Agent, or Firm—Smith, Harding, Earley & Follmer

[57] ABSTRACT

A seal for sealing between a rotating member and a housing comprises a seal ring mounted for movement towards and away from the rotating member and having a high pressure side, a low pressure side, and a face opposed to the rotating member. Resilient means urge the seal ring towards the rotating member. Hydrodynamic means in the form of a plurality of spaced recesses in that face of the seal ring opposed to the rotating member, with the entry to each recess more restricted than its exit so as to produce negative hydrodynamic lift in the recess and urge the seal ring towards the rotating member. A seal is provided between the housing and the seal ring.

12 Claims, 18 Drawing Figures

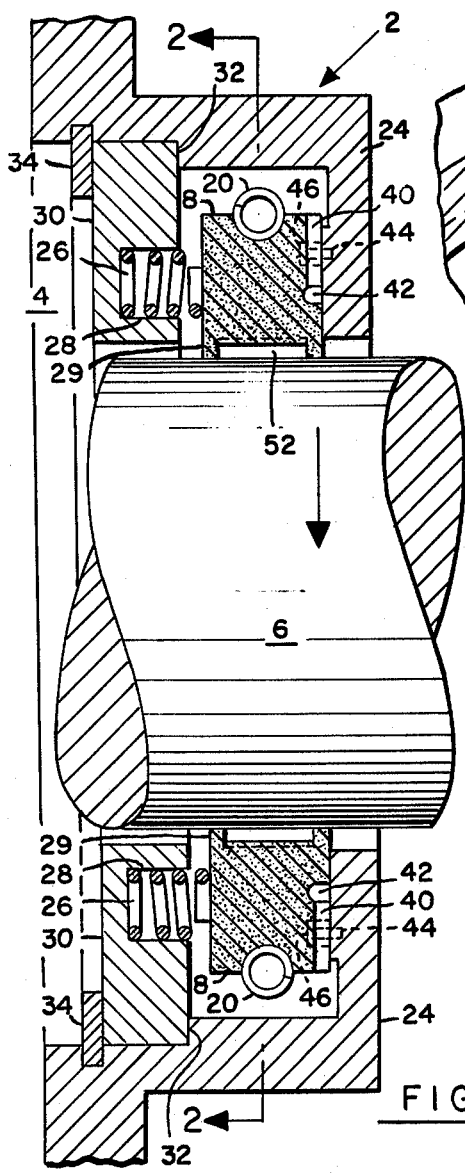
FIG. 1.
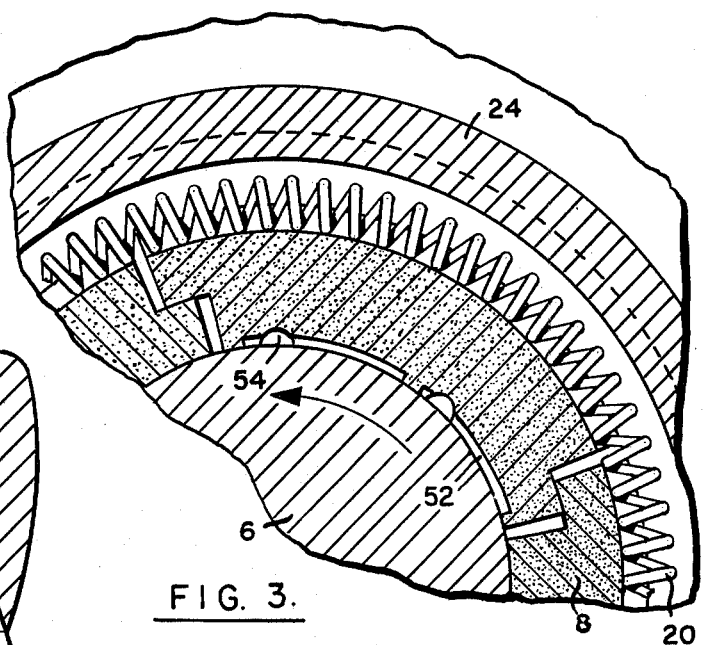
FIG. 3.
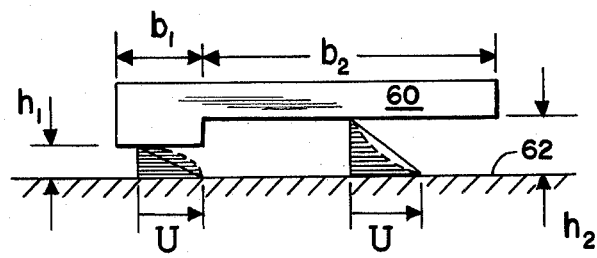
FIG. 3A.
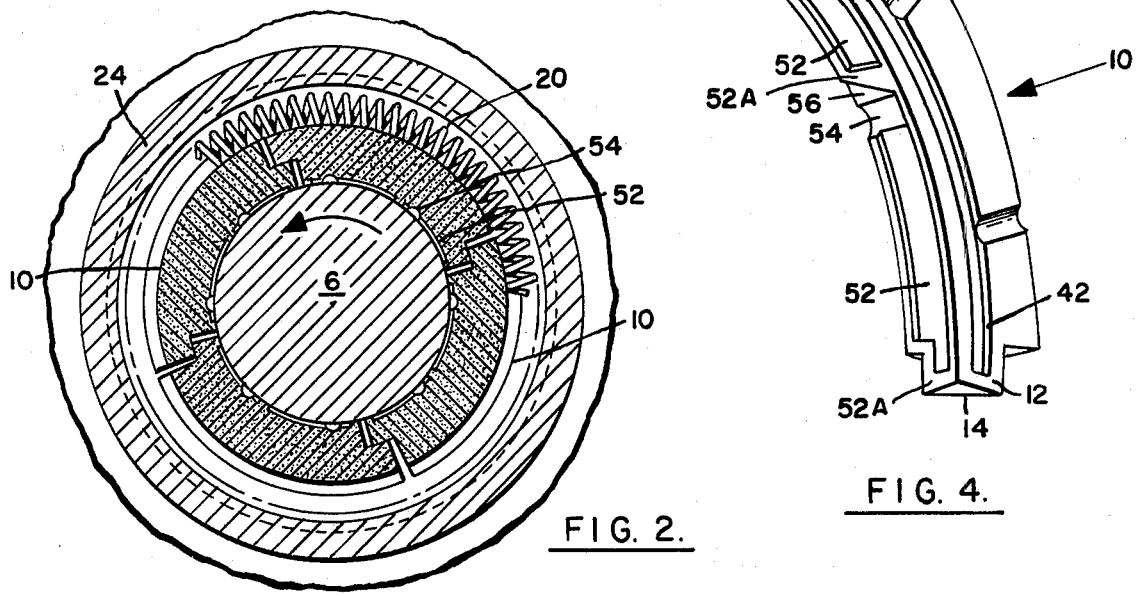
FIG. 2.
FIG. 4.

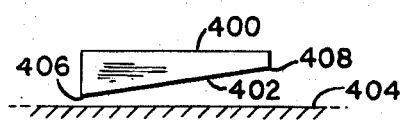
FIG. 12.
FIG. 13.
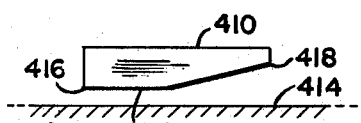
FIG. 14.
FIG. 15.
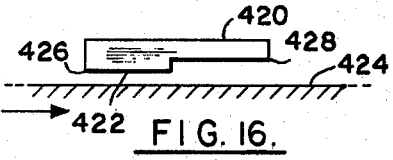
FIG. 16.
FIG. 17.
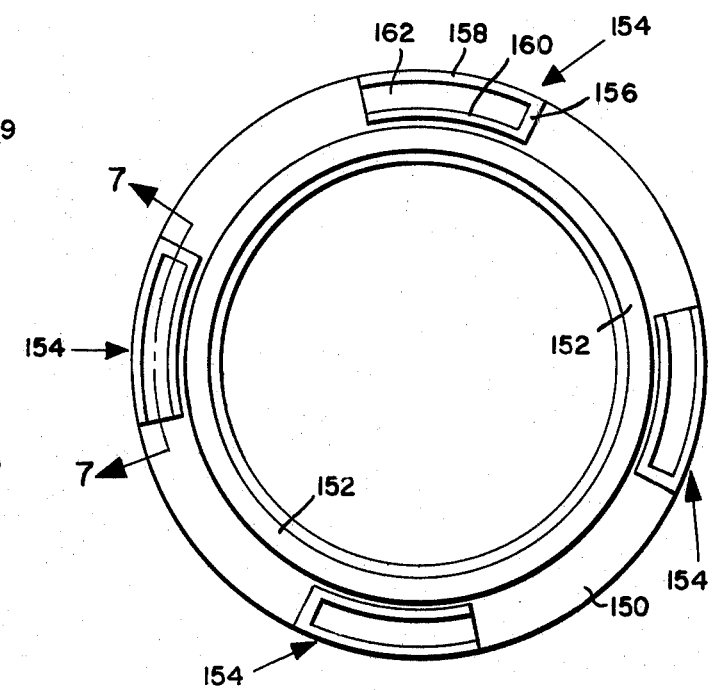
FIG. 6.
FIG. 7.
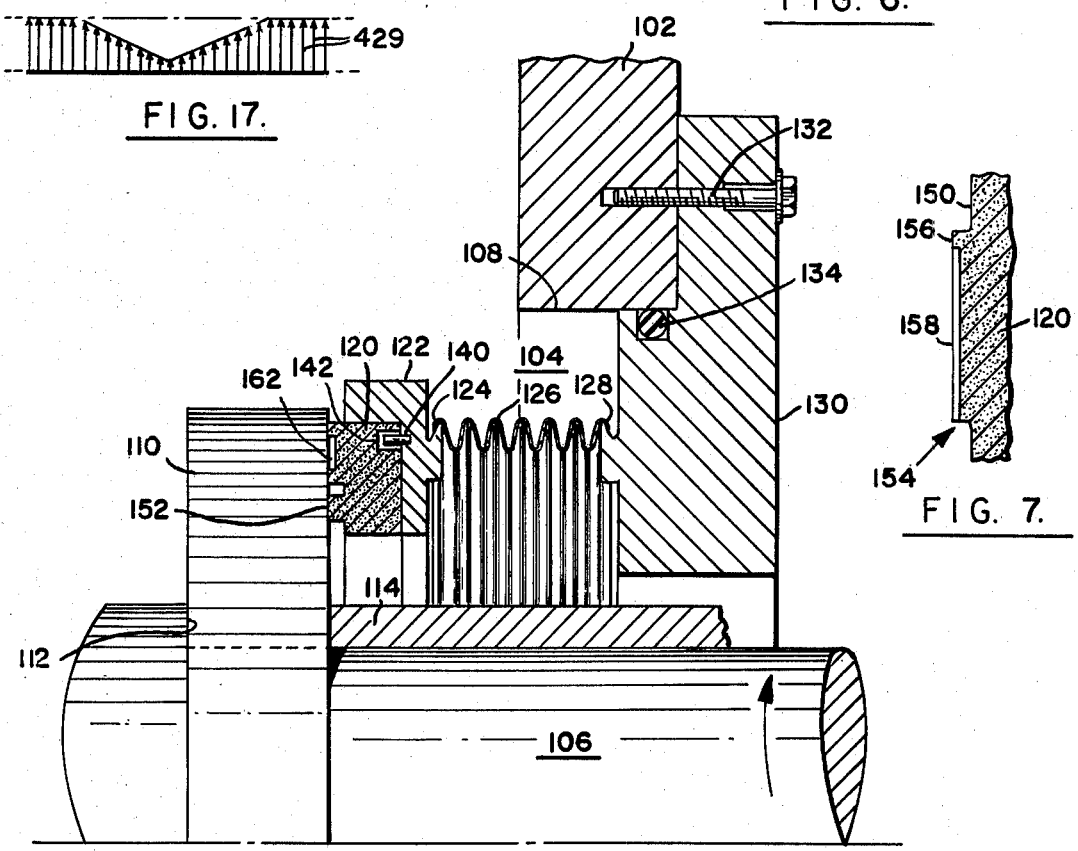
FIG. 5.

SEAL FOR SEALING BETWEEN A ROTATING MEMBER AND A HOUSING

BACKGROUND OF THE INVENTION

It is common knowledge that the performance of a shaft seal of any type is greatly affected by the physical properties of the fluids which it seals and that fluid properties, such as density, viscosity, specific heat, etc. can affect the performance of the seal. For example, rubbing seals of the segmented circumferential type for sealing between a housing and a rotating member have been in use for many years as main bearing shaft seals on aircraft jet engines and on gas compressors (U.S. Pat. No. 2,908,516). The segments of such seals, when sealing liquids, tend to "surf-board" on the fluid film between the segments and the rotating member, causing the segments to be lifted out of contact with the surface on which they are intended to rub resulting in excessive leakage. This has limited such seals to use largely in dry gas applications. In such applications it is known to reduce rubbing loads by giving the rubbing seal a configuration producing a decrease in fluid film thickness in the direction of the rotation of the rotary member to produce a positive hydrodynamic lift to space the seal away from the rotating member a small distance, for example 0.005 mm. It is also known from U.S. Pat. No. 3,516,678 to maintain a limited leakage shaft seal in a balanced position by providing a film leakage path from the high pressure side to the low pressure side of the seal which has a step down in thickness providing a pressure gradient along the path which varies with the film thickness. This is a hydrostatic seal.

Heretofore, rubbing shaft seals which were required to seal both gas and liquid, alternatively, posed very difficult problems, especially when rubbing speeds were considerable. The difficulties resulted from the differences in the nature of the fluids. Gases, in general, have lower viscosity, lower density and lower heat capacity per unit volume than liquids. Limits of rubbing load to prevent overheating are much lower with gas seals than with liquid seals. The face drag with liquid seals for a given rubbing velocity is much higher than the face drag with gas seals. A consequence of the face drag is that the loadings on rotational locking devices and other restraints are very much higher in liquid seals than in gas seals for the same rubbing velocity. Heretofore, to overcome the friction resulting from these higher loadings, the axial springing had to be higher with liquid seals than with gas seals. When the seal ring is sealing against a ring secured to a shaft even a small out-of-flatness of about 30 millionths of an inch can cause high lift-off of the seal face when liquids are being sealed due to the hydrodynamic effect in the convergent fluid film regions causing excessive leakage unless the face load is increased sufficiently to prevent such lift-off. Nutational oscillation of the seal face is a common problem. These factors have made the use of rubbing seals to seal both gases and liquids, alternatively, unsatisfactory.

The above discussed problems are solved by this invention.

BRIEF SUMMARY OF THE INVENTION

This invention provides a seal ring having a configuration which provides negative lift to urge the seal ring towards the rotatable member by providing a plurality of spaced paths for fluid in the housing which extend about the sealing face of the seal ring with each path producing a film of liquid which is in contact with the rotatable member and which increases in depth in the direction of the rotation of the rotatable member to produce negative hydrodynamic lift. The seal ring can take a variety of forms, for example, sealing directly against a rotating shaft or sealing against a face of a mating ring carried by a rotating member.

BRIEF DESCRIPTION OF THE DRAWINGS

FIG. 1 is a vertical section through a seal in accordance with the invention sealing between a housing and a rotating shaft;

FIG. 2 is a vertical section taken on the plane indicated by the line 2—2 in FIG. 1;

FIG. 3 is an enlarged view, partially broken away, of the structure shown in FIG. 2;

FIG. 3A is a diagrammatic view of a negative lift device for a seal;

FIG. 4 is a perspective view of a segment of the seal ring shown in FIG. 1 taken from the low pressure side;

FIG. 5 is a vertical section, partially broken away, through an alternative seal ring embodiment in accordance with the invention;

FIG. 6 is an elevational view of the sealing face of the seal ring in FIG. 5;

FIG. 7 is a section taken on the line 7—7 in FIG. 6;

FIG. 12 is a diagrammatic view of an alternative configuration for the negative lift element of the seal;

FIG. 13 is a pressure diagram of the lift element of FIG. 12;

FIG. 14 is a diagrammatic view of an alternative configuration for the negative lift element of the seal;

FIG. 15 is a pressure diagram of the lift element of FIG. 14;

FIG. 16 is a diagrammatic view of an alternative configuration for the negative lift element of the seal; and FIG. 17 is a pressure diagram of the lift element of FIG. 16.

DETAILED DESCRIPTION

Figure 9:
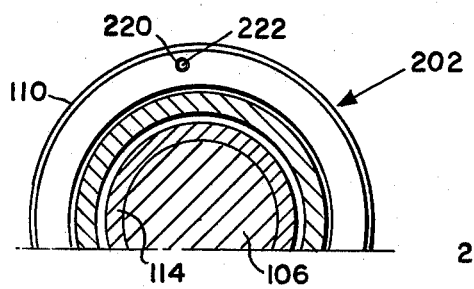
FIG. 9 is a vertical section taken on the plane indicated by the line 9—9 in FIG. 8.

As shown in FIG. 1 a housing 2 forms a chamber 4 adapted to contain a fluid. A shaft 6 passes through housing 2 into chamber 4. A seal ring 8 has four segments 10 (FIG. 2). Each segment 10 has an offset tongue portion 12 (FIG. 4) with a diagonal face 14 which mates with a diagonally cut groove portion 16 on the adjacent segment 10 to provide for continuous sealing structure irrespective of any expansion or contraction of seal ring 8. The segments 10 are urged into contact with shaft 6 by a garter spring 20. The downstream faces 22 of segments 10 are urged against flange 24 of casing 2 by compression coil springs 26 contained in pockets 28 of closing ring 30 which is retained between casing shoulder 32 and retaining ring 34.

The downstream face 22 of each segment is provided with grooves 40 connected to a peripheral groove 42 to permit the passage of fluid from chamber 4 into groove 42 to counterbalance in part and fluid pressure on the high pressure side 29 to reduce the pressure loading of the segments against flange 24. Locking pins 44 (FIG. 1) mounted in flange 24 fit loosely in openings 46 in seal ring 8 to prevent the segments 10 from rotating and yet permit the segments to move towards and away from shaft 6.

Grooves 40 and 42 would be unnecessary where the fluid in chamber 4 is at nominal pressure.

The above described structure is conventional in the art.

The sealing face 50 has a pair of shallow recesses 52. Typically the depth of each recess 52 will be in the range of from about 0.002 to about 0.030 cm. depending on fluid viscosity and shaft speed. The end of each recess 52 in the direction of the rotation of shaft 6 opens into an axial cutout portion 54 in face 50 which also forms an opening in face 29 so that each recess 52 is thereby placed in direct communication with the fluid in chamber 4. Axial cutout portion 54 has an angled portion 56 which acts as a fluid scraper facilitating the flow of fluid into chamber 4.

In operation with a liquid in chamber 4, the rotation of shaft 6 causes a shear-drag on the liquid in recess 52 which would move the liquid in the recess toward the axial cutout portions 54 except that the reduced film thickness at the entry surface 52A impedes inflow into the recess. This, as will be explained later, results in a lowering of the pressure in the recess and effectively creates negative hydrodynamic lift. This negative lift force, which urges the seal toward the shaft surface can be made of such magnitude that it precludes "surfboarding" and excessive leakage past the seal.

The negative lift is a function of absolute viscosity of the liquid, relative velocity of coacting solid surfaces, length and width of the recess, length of the entry surface and the difference in film depths. The following discussion will make the operation of the seal obvious. Referring to FIG. 3A, in the case of the negative lift device indicated at 60, if there were no continuity of flow requirement linking sections $b_1$ and $b_2$, the velocity U of the boundary indicated at 62 would cause laminar flow in sections $b_1$ and $b_2$ of the following magnitudes per unit width:

$$q_1 = \tfrac{1}{2} h_1 U; \quad q_2 = \tfrac{1}{2} h_2 U$$

Because the flow through length $b_1$ must equal that in length $b_2$, there must be an added flow in length $b_1$ and a reduced flow in length $b_2$ as indicated by the dotted lines in the diagram in FIG. 3A. These added flows can be calculated by superposition, and a pressure gradient is necessary to sustain the added flows. Therefore, assuming no side edge leakage, $$q_1 = \tfrac{1}{2} h_1 U + \frac{h_1^3}{12\mu} \frac{dp}{dl} = \tfrac{1}{2} h_1 U + \frac{h_1^3}{12\mu} \frac{\Delta P}{b_1}$$

$$q_2 = \tfrac{1}{2} h_2 U - \frac{h_2^3}{12\mu} \frac{\Delta P}{b_2}$$

where $dp/dl$ is the pressure gradient which is uniform in each of sections $b_1$ and $b_2$, $\Delta P$ is the change in pressure from either end of the device to the step and $\mu$ is absolute velocity.

Since the flow must be the same in the two sections under consideration $$\tfrac{1}{2} h_1 U + \frac{h_1^3}{12\mu} \frac{\Delta P}{b_1} = \tfrac{1}{2} h_2 U - \frac{h_2^3}{12\mu} \frac{\Delta P}{b_2}$$

$$\left( \frac{h_1^3}{b_1} + \frac{h_2^3}{b_2} \right) \frac{\Delta P}{12\mu} = \tfrac{1}{2} (h_2 - h_1) U$$

$$\Delta P = \frac{6\mu (h_2 - h_1) U}{\frac{h_1^3}{b_1} + \frac{h_2^3}{b_2}}$$

and, since the pressure gradients are uniform the hydrodynamic force created is $$W = \tfrac{1}{2} (b_1 + b_2) \Delta P a, \text{ (where } a \text{ is the width)}$$

$$= \tfrac{1}{2} (b_1 + b_2) \times \frac{6\mu (h_2 - h_1) U a}{\frac{h_1^3}{b_1} + \frac{h_2^3}{b_2}}$$

$$= \frac{3 b_1 b_2 (b_1 + b_2) \Delta h \, \mu \, U a}{b_2 h_1^3 + b_1 h_2^3}$$

where $\Delta h = h_2 - h_1$

In particular, when as in actual practice $h_1$ becomes very small, tht is the surfaces along $b_1$ make contact, $h_2$ then becomes equal to $\Delta h$ and the equation reduces to $$W = \frac{3\mu \, U b_2 (b_1 + b_2) a}{\Delta h^2}$$

and flow is negligible, wherein as discussed above
$\mu$ = absolute viscosity
$U$ = rubbing velocity
$b_1$ = length of entry surface
$b_2$ = length of recess
$a$ = width of recess
$\Delta h$ = depth of recess It will be understood that this equation may be used for both liquids and gases, so long as the pressure change for the gas is nominal. For a typical seal of the type shown in FIGS. 1–4 with a recess (52) width of $a = 0.6$ cm., $b_1 = 0.25$ cm., $b_2 = 3$ cm., $U = 2000$ cm. per sec., $\Delta h = 0.02$ cm. operating with oil having a viscosity of 0.1 poise, the negative lift of each negative lift area becomes $$W = \frac{3 \times .1 \times 2000 \times 3 \times 3.25 \times .6}{.0004}$$

$$= 8.775 \times 10^6 \text{ dynes} = 19.727 \text{ pounds}$$

or a total of 78.908 pounds for a seal having four negative lift areas. The same seal, operating with water having a viscosity of 0.01 poise would develop negative lift in each recess of 1.973 pounds. When operating with air, which has a viscosity of about 185 micropoise at room temperature, the negative lift would be 0.0355 pounds per lift area. This markedly reduces the face drag on the seal and the consequent loading of the rotational locking devices. It is seen that the negative lift for a recess of given geometry is directly proportional to the viscosity of the fluid. Since the viscosity of liquids is very much greater than the viscosity of common gases (by a factor of 100 to 1000 times) the recess can be proportioned to produce a very substantial negative lift or suction when operating with a liquid, whereas the negative lift force when operating with a gaseous medium will be negligible.

Inspection of the equation will disclose that the force varies inversely with the square of the height of the step and, if the length $b_1$ is small, almost directly with the square of the length. Therefore, doubling the height of the step or halving the length will reduce the load to a quarter of the magnitude. Thus, the proportions of the device can be patterned to fit a variety of purposes. The recesses can be made long and narrow or short and wide and many combinations of depth, width and length to produce a given force or to fit a particular area are possible.

An alternative embodiment involving sealing against a rotating ring is shown in FIGS. 5, 6 and 7. Here a casing 102 forms a chamber 104 which is adapted to contain a fluid. A rotating shaft 106 passes through an opening 108 in casing 102 and carries a seal mating ring 110 which is held against a shoulder 112 on shaft 106 by a securing sleeve 114 secured to shaft 106 by a nut (not shown) on shaft 106. A rubbing seal ring 120 is carried by a seal holder 122 which is connected to end 124 of resilient bellows 126. The other end 128 of bellows 126 is connected to a flange 130 which is secured to casing 102 by bolts 132. A seal 134 seals between casing 102 and flange 130. Bellows 126 through carrier 122 urges seal ring 120 against ring 110. A pin 140 secured in holder 122 is loosely engaged in an opening 142 in seal ring 120 to prevent the rotation of the seal ring. As thus described the structure is conventional and need not be further detailed.

The sealing face 150 of seal ring 120 has a circumferential raised portion 152 which seals between the seal ring 120 and mating ring 110. The sealing face 150 also carries four spaced raised pocket pads 154 each having a raised entrance rail 156 forming an entrance surface, a raised side rail 158 and a raised side rail 160. The top surfaces of rails 156, 158 and 160 are co-planar with the surface of raised portion 152. The surface 162 of each pad 154 within the aforesaid rails is depressed a small distance below said plane, typically in the range of from about 0.002 to about 0.03 cm. The surface 162 is situated above the face 150 of the seal ring 120 by a typical distance of 0.15 to 0.30 cm.

When the chamber 104 is filled with a liquid under substantial pressure the raised portion 152 of seal ring 120 will be abutting against mating ring 110 when the shaft 106 is at rest with only a very thin film of liquid between them. The rotation of shaft 106 causes a negative lift strongly urging the seal ring 120 against mating ring 110 to reduce the thickness of the film between raised portion 152 and mating ring 110 and hence preventing heavy leakage due to the seal ring 120 lifting off. Nutational oscillation is also prevented.

The seal can be designed with the bellows 126 providing only a light rubbing load, suitable for operation with a gas. When operating with a liquid, the negative lift pads 154 provide the added load required for operation as a liquid seal.

Figure 8:
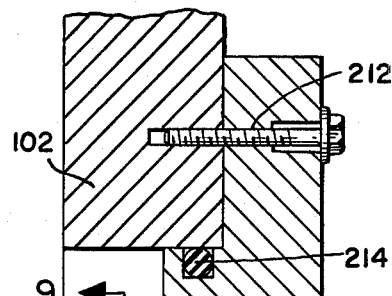
FIG. 8 is a vertical section, partially broken away, of an alternative ring seal in accordance with the invention.
Figure 8:
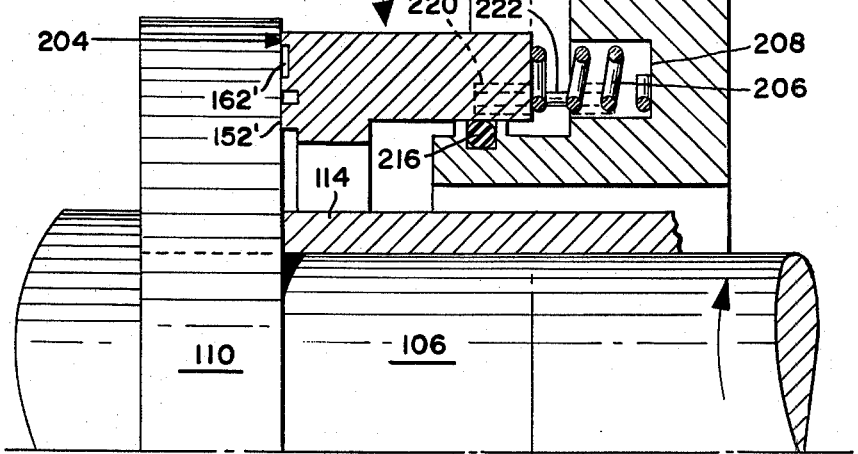

Referring now to FIG. 8 a modified seal ring 202 for sealing between housing 102 and seal mating ring 110 carried by shaft 106 has a sealing face 204 which is identical with the sealing face 150 of seal ring 120 with corresponding parts thereof being given corresponding prime numbers. Reference may be had to FIG. 6 for details of the configuration of the sealing face.

Seal ring 202 is urged against ring 110 by compression coil springs 206 (only one of which is shown) carried in pockets 208 in flange 210 bolted to casing 102 by bolts indicated at 212. A seal 214 seals between flange 210 and casing 102 and a seal 216 seals between flange 210 and seal ring 202. Seal ring 202 has a pocket 220 (FIG. 9) for the reception of pins 222 secured in flange 210 and acting to prevent the rotation of seal ring 202.

Assuming that the embodiment of FIG. 8 is designed to act normally as a gas seal, the springs 206 will be selected to provide a small rubbing load to prevent overheating of seal ring 202. In sealing against a gas, the face drag on seal ring 202 will be relatively small so that the loading on pins 222 will be such that the seal ring 202 can move freely towards and away from ring 110. Assuming now that seal ring 202 is subjected to a surge of oil, the sealing face 204 will cause a large force to urge seal ring 202 towards ring 110 preventing "surfboarding" and the consequent leakage and also overcoming the friction between pins 222 and seal ring 202 incident to the much higher face drag on ring 202 due to the presence of the oil.

Figure 10:
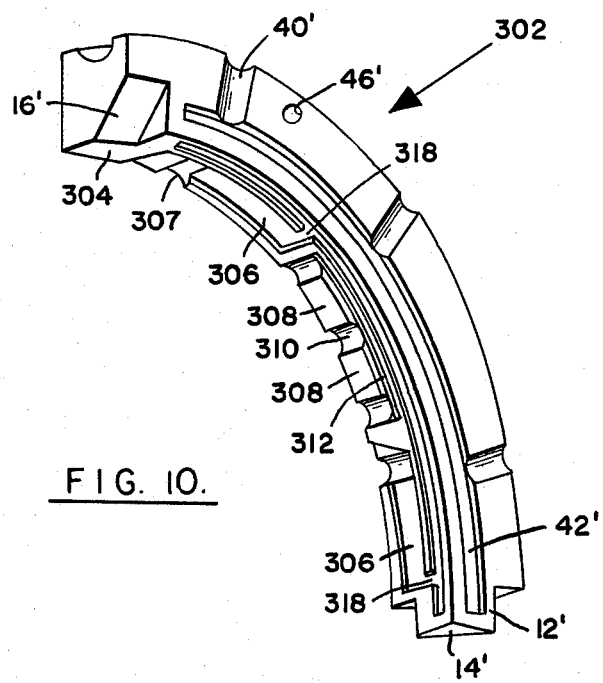
FIG. 10 is a perspective view of a modified ring seal segment.
Figure 11:
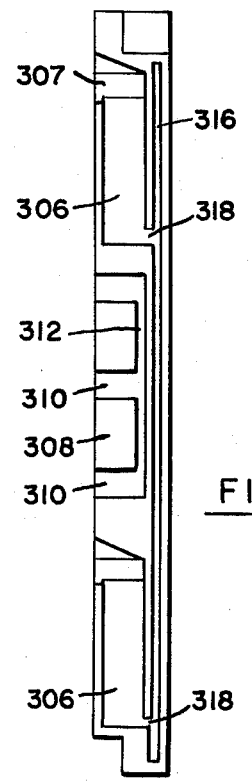
FIG. 11 is a development view of the sealing face of the ring seal of FIG. 10.

Referring now to FIG. 10 a seal ring segment 302 is a modification of seal ring segment 10. Since most of the structure is identical to seal ring 10 only the new aspects will be described with the similar structural aspects being given corresponding prime numbers. The modifications are in the sealing face 304 which has narrower and shorter recesses 306 with a more extensive bearing surface 308 between the recesses. This additional bearing surface is advantageous in providing a better distribution of the load on the seal ring and a longer life. Each recess 306 communicates with the interior of the chamber being sealed through a cutout portion 307. Bearing surface 308 has grooves 310 cut in it, the grooves 310 leading to a groove 312. The fluid in grooves 310 and groove 312 acts to urge segment 302 away from the shaft against which it is sealing to reduce the rubbing load particularly when a gas is being sealed. When a liquid is being sealed, this structural aspect will not materially counterbalance the force exerted by recesses 306.

A groove 316 which is downstream from recesses 306 is connected to each recess 306 by a passage 318. Fluid which leaks into groove 316 will flow through a passage 318 into a recess 306 since the pressure therein is considerably below the system fluid pressure.

As is evident from the above description, the crux of the negative lift configurations is that they provide a film thickness at the leaving end which is greater than the film thickness at the entering end. Thus innumerable configurations can be used. By way of further illustration a pad 400 (FIG. 12) can have a surface 402 opposite the surface 404 of a rotating mating ring with the surface 402 having a constant slope from the entrance 406 to the discharge end 408. The negative lift is illustrated by the pressure diagram shown in FIG. 13 in which the length of the arrows 409 is proportional to the pressure. Again, as illustrated in FIG. 14, a pad 410 can have a compound flat plug sloping surface 412 opposite the surface 414 of a rotating mating ring extending from the entrance end 416 to the discharge end 418. The resulting negative lift is illustrated in the pressure diagram of FIG. 15 by arrows 419. By way of further illustration a pad 420 (FIG. 16) can have a surface 422 which is opposite a surface 424 of a mating ring which is abruptly stepped between the entrance end 426 and the discharge end 428 with a negative lift as illustrated in the pressure diagram in FIG. 17 by arrows 429. Obviously a variety of related configurations involving planes and curves of such form as to restrict inflow into the negative lift regions would be equivalent structures. Furthermore, the negative lift devices can be made either with or without the side rails such as side rails 158 and 160 of FIG. 6. These side rails restrict edge leakage and thereby increase the effectiveness of the device.

The seal rings may be made of the materials usually employed for rubbing seals such as carbon-graphite or bronze.

It will be understood that the above discussed embodiments are illustrative and are not intended to be limiting.

I claim:

1. In a rubbing seal for sealing between a rotatable member and a housing containing a fluid and having (1) a seal ring mounted for movement towards and away from the rotatable member and having a sealing face with a circumferential sealing portion sealing against the rotatable member, (2) means to bias said sealing face of the seal ring towards the rotatable member, and (3) means to limit the rotation of the seal, the improvement comprising:

a plurality of circumferential sections of the sealing face upstream of the circumferential sealing portion confronting the rotatable member, the leading portion of each of said sections with respect to the direction of relative rotation being spaced closer to the rotatable member than is the remaining portion of the section and the regions in the sealing face immediately preceding and following each section being in unrestricted communication with the interior of the housing and further removed from the rotatable member than the remaining portion of the section, to produce a negative hydrodynamic lift urging the seal ring towards the rotatable member due to the fluid flow induced by the rotation of the rotatable member.

2. A seal in accordance with claim 1 in which said remaining portion and said regions are recessed in the seal ring.

3. A seal in accordance with claim 2 in which the recess is spaced away from the upstream edge of the sealing face.

4. A seal in accordance with claim 1 in which the leading portion and remaining portion of each section forms a step in the seal ring.

5. A seal in accordance with claim 1 in which the distance the remaining portion is spaced away from the rotatable member increases from its leading end to its trailing end with respect to the direction of relative rotation.

6. A seal in accordance with claim 1 in which the rotatable member is a shaft and the seal ring is formed of a plurality of segments each of which has at least one of said sections.

7. A seal in accordance with claim 1 in which the rotatable member is a mating ring coaxial with and secured to a shaft and the sealing face of the seal ring confronts a transverse face of the mating ring.

8. A seal in accordance with claim 7 in which the sealing portion of the sealing face is a raised strip sealing against the transverse face of the mating ring and each section comprises a raised pad.

9. A seal in accordance with claim 8 in which each pad has a recess spaced from the side edges of the pad forming the remaining portion of the section.

10. A seal in accordance with claim 1 in which the rotatable member is a shaft and the seal ring is formed of a plurality of segments each of which has at least one of said sections with the remaining portion of each section being recessed in the sealing face of the seal ring and in which each segment has a circumferential groove in the sealing portion for the collection of leaking fluid and a passage connecting said groove to the leading end of a section remaining portion for drawing fluid from the groove for return to the interior of the housing.

11. In a circumferential rubbing seal for sealing between a shaft and a housing containing a fluid and having (1) a seal ring mounted for movement towards and away from the shaft and having a plurality of segments each having a sealing face with a circumferential sealing portion sealing against the shaft with the sealing portions of adjacent sections in contact to form a continuous seal, (2) means to bias the sealing face of each segment towards the shaft, (3) and means to limit the rotation of the seal ring, the improvement comprising:

at least one circumferential section in each segment upstream of the circumferential sealing portion, said section having a recess in its trailing end with respect to the direction of relative rotation, the leading end of said section with respect to the direction of relative rotation having substantially the same radius as the circumferential sealing portion, and the leading end of said section and the trailing end of the section with respect to the direction of relative rotation being adjacent regions of the sealing face which are in unrestricted communication with the interior of the housing and which are at a distance from the shaft greater than the depth of the recess, to produce a negative hydrodynamic lift urging the seal ring segments towards the shaft due to the fluid flow induced by the rotation of the shaft relative to the seal ring.

12. In a face rubbing seal for sealing between a mating ring mounted on a shaft and a housing containing a fluid and having (1) a seal ring mounted for movement towards and away from the mating ring and having a sealing face with a raised circumferential sealing strip for sealing against a transverse face of the mating ring, (2) means to bias the sealing face of the seal ring towards the mating ring, and (3) means to limit the rotation of the seal, the improvement comprising:

a plurality of circumferentially extending raised pads on the sealing face upstream of the circumferential sealing strip, each pad having a leading portion with respect to the direction of relative rotation with its outer face in substantially the same plane as the face of the sealing strip and each pad having a recess trailing the leading portion of the pad with respect to the direction of relative rotation, the regions of the sealing face adjacent the leading and trailing ends of each pad in the direction of relative rotation being at a distance from the mating ring greater than the depth of the recess and being in unrestricted communication with the interior of the housing.

* * * * *